United States Patent [19]

Suzuki et al.

[11] Patent Number: 5,440,341
[45] Date of Patent: Aug. 8, 1995

[54] SIGNAL PROCESSING CIRCUIT FOR A SIMULTANEOUS ELECTRONIC ENDOSCOPE APPARATUS

[75] Inventors: Shigeo Suzuki; Fujio Okada, both of Omiya, Japan

[73] Assignee: Fuji Photo Optical Co., Ltd., Saitama, Japan

[21] Appl. No.: 245,483

[22] Filed: May 18, 1994

[30] Foreign Application Priority Data

May 20, 1993 [JP] Japan .................................. 5-141566

[51] Int. Cl.6 .............................................. H04N 9/64
[52] U.S. Cl. ...................................... 348/256; 348/70; 348/71
[58] Field of Search ...................... 348/256, 45, 65, 70, 348/71, 270, 625, 629, 630

[56] References Cited

U.S. PATENT DOCUMENTS

| | | | |
|---|---|---|---|
| 4,754,323 | 6/1988 | Kaji et al. | 348/256 |
| 5,032,913 | 7/1991 | Hattori et al. | 348/70 |
| 5,144,399 | 9/1992 | Nakayama et al. | 348/625 |

*Primary Examiner*—James J. Groody
*Assistant Examiner*—Glenton B. Burgess
*Attorney, Agent, or Firm*—Ronald R. Snider

[57] ABSTRACT

A simultaneous electronic endoscope apparatus which is capable of preventing the deterioration of the picture quality due to the difference of the saturation property in mixture signals. The apparatus comprises a charge coupled device provided with a plurality of color filters. Upper and lower pixel signals are mixed in a charge coupled device so as to form mixture signals. When the saturated state of a mixture signal is detected, the gain of the mixture signal is multiplied by a preset coefficient so as to apparently cancel the saturated state. Alternatively two types of luminance signals may be formed by combining the plurality of mixture signals formed on each horizontal scanning line. When the saturated state of a luminance signal is detected, the gain of the luminance signal is amplified so that the level thereof is the same as that of the other luminance signal, thereby apparently cancelling the saturated state.

2 Claims, 5 Drawing Sheets

SIGNAL PROCESSING CIRCUIT FOR A SIMULTANEOUS ELECTRONIC ENDOSCOPE

BACKGROUND OF THE INVENTION

This application claims the priority of Japanese Patent Application No. 5-141566 filed on May 20, 1993 which is incorporated herein by reference.

1. Field of the Invention

The present invention relates to a signal processing circuit of a simultaneous electronic endoscope apparatus and, more particularly, to the structure of processing of a video signal in a simultaneous electronic endoscope apparatus provided with a color filter for each pixel.

2. Description of the Related Art

An electronic endoscope apparatus is an apparatus for observing a body cavity such as an alimentary canal and a capillary of a structural body through an electronic endoscope provided with a CCD (Charge Coupled Device) as a solid-state image sensor at the end portion thereof. As such an electronic endoscope apparatus, a simultaneous electronic endoscope apparatus is known. In this apparatus, pixel signals are extracted through a color filter provided for each pixel and, video signals such as a luminance signal and a color difference signal are formed from the pixel signal.

FIG. 7(A) shows the arrangement of color filters which are provided on the surface of a CCD 1 in a simultaneous electronic endoscope apparatus. As shown in FIG. 7A, four kinds of filters, namely, Mg (magenta), Cy (cyan), G (green) and Ye (yellow) filters for the respective pixels are disposed in a predetermined positional relationship. Color filters arranged as shown in FIG. 7(A) as one pattern are repeatedly provided on the entire image pickup area. The signals obtained in the respective pixels of the CCD 1 through the color filters are alternately output in the form of the mixtures (sums) of the upper and the lower signals Cy G (A), Ye+Mg (B), . . . on a first horizontal scanning lines ODD1 of an odd field, and in the form of the mixtures (sums) of the upper and the lower signals Cy+Mg (C), Ye+G (D), . . . on a second horizontal scanning line ODD2, as shown in FIG. 7(B). Similarly, the signals are repeatedly output thereafter in the form of the sums to the last horizontal scanning line. In the even fields, the mixture signals of the upper and the lower signals signals are also alternately output as the signal of horizontal scanning lines EVEN1, EVEN2, . . .

From the outputs of the CCD 1 obtained in this manner, a luminance signal Y, and color difference signals, (R (red)—Y) and (B (blue)—Y), for example, are calculated by an operation circuit such as a color separation circuit, and these signals are converted into a composite video signal by an encoder or the like and output to a monitor, thereby displaying the image of the object of observation on the monitor.

The above-described conventional charge coupled device for an electronic endoscope, however, suffers from a problem of the deterioration of the picture quality due to the difference of the saturation property in the CCD outputs of the mixture signals which is caused by the difference of the sensitivity in the color filters. When the signals shown in FIG. 7 are processed, if the mixture signal Cy+G on the horizontal scanning line ODD1 is assumed to be A, Ye+Mg to be B, the mixture signal CY+Mg on the horizontal scanning line ODD2 is assumed to be C and Ye+G to be D, the saturation properties of these mixture signals in the wavelength range on the red side are as shown in FIG. 8. Since the sensitivities of Mg (magenta) and Ye (yellow) are higher than those of Cy (cyan) and G (green), the mixture signals B, D, C and A reach the saturation point E when the quantities of incident light are P1, P2, P3 and P4, respectively. In this case, if the outputs of the mixture signals exceed the saturation point E, the luminance signals on the horizontal scanning lines become different from each other, so that scanning lines loom around a whitish saturation region 100, thereby deteriorating the picture quality.

SUMMARY OF THE INVENTION

Accordingly, it is an object of the present invention to eliminate the above-described problems in the related art and to provide a signal processing circuit of a simultaneous electronic endoscope apparatus which is capable of preventing the deterioration of the picture quality due to the difference of the saturation property in the CCD outputs of the mixture signals.

To achieve this end, in a first aspect of the present invention, there is provided a signal processing circuit of a simultaneous electronic endoscope apparatus comprising: an image pickup device circuit for forming a plurality of mixture signals by combining pixel signals obtained through color filters; a sampling circuit for sampling a predetermined mixture signal out of said plurality of mixture signals; a saturation state detection circuit for judging whether or not the sampled signal is saturated; and a gain control circuit for controlling the gain of the saturated mixture signal so as to be amplified when the saturated state is detected.

Each of the mixture signals is obtained by mixing an upper pixel signal and a lower pixel signal in a charge coupled device, and the gain control circuit amplifies the gain of the mixture signal in the saturated state to a multiple of a preset coefficient. According to this structure, if, for example, the mixture signal Ye+Mg (B) is sampled and the saturated state of the mixture signal is detected, the gain control circuit multiplies the gain of the mixture signal B by a preset coefficient. It is therefore possible to process the mixture signal as an apparently unsaturated signal.

In a second aspect of the present invention, there is provided a signal processing circuit of a simultaneous electronic endoscope apparatus comprising: an image pickup device circuit for forming a plurality of mixture signals by combining pixel signals obtained through color filters; a luminance signal forming circuit for forming two types of luminance signals by combining the plurality of mixture signals formed on each horizontal scanning line; a saturation state detection circuit for judging whether or not a luminance signal is saturated; and a gain control circuit for controlling the gain of the luminance signal so as to adjust the level of the luminance signal to the level of the other luminance signal when the saturated state is detected.

According to this structure, if, for example, a luminance signal containing the mixture signal Ye+Mg (B) is saturated, the gain of the luminance signal is amplified so as to agree with the gain of the other luminance signal. The saturated state of the mixture signal is therefore cancelled on the basis of the luminance signal, thereby preventing the looming of the scanning lines.

The above and other objects, features and advantages of the present invention will become clear from the following description of the preferred embodiments thereof, taken in conjunction with the accompanying drawings.

BRIEF DESCRIPTION OF THE DRAWINGS

FIG. 2(A) shows an example of the arrangement of the color filters in the first embodiment shown in FIG. 1;

FIG. 2(B) shows the signals read out on each horizontal scanning line;

DESCRIPTION OF THE PREFERRED EMBODIMENTS

Figure 1:
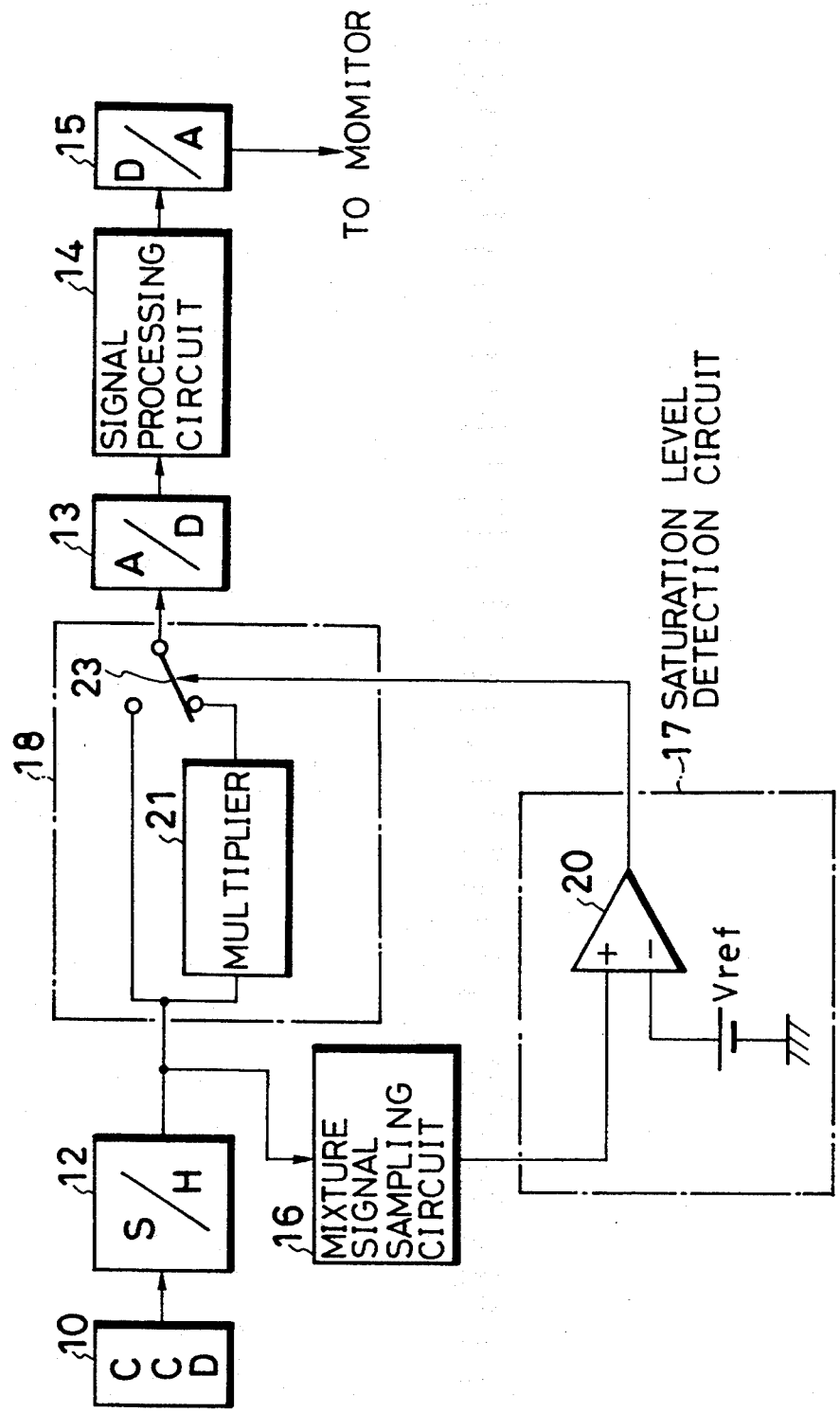
FIG. 1 is a block diagram of the structure of a first embodiment of a signal processing circuit of a simultaneous electronic endoscope apparatus.
Figures 2A, 2B:
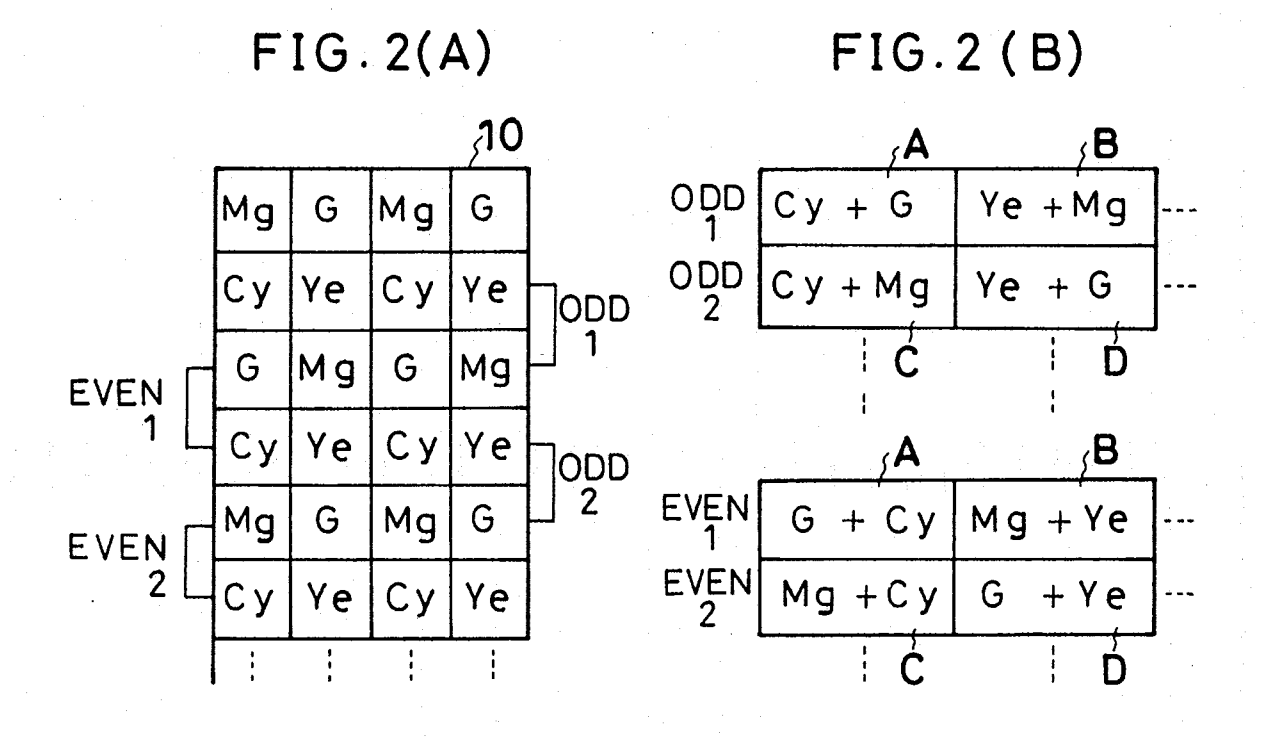

FIG. 1 shows the structure of a first embodiment of a signal processing circuit of a simultaneous electronic endoscope apparatus according to the present invention, and FIG. 2 shows the structure of color filters in a charge coupled device and the signals read out through the color filters. Light receiving elements composed of a photodiode or the like are arranged in a matrix for each pixel in the image pickup area of a CCD 10, as shown in FIG. 2(A), and color filters Cy (cyan), G (green), Ye (yellow) and Mg (magenta) are formed on the light receiving elements. A mixture signal of the signals of second and third lines are read out on a horizontal scanning line ODD 1 of an odd field and a mixture signal of the signals of fourth and fifth lines are read out on a horizontal scanning line ODD2. On the other hand, a mixture signal of the signals of third and fourth lines are read out of a horizontal scanning line EVEN1 of an even field and a mixture signal of the signals of fifth and sixth lines are read out of a horizontal scanning line EVEN2.

In this way, the mixture signal Cy+G (referred to as "A") and the mixture signal Ye+Mg (referred to as "B") are alternately obtained on the horizontal scanning line ODD1, and the mixture signal Cy+Mg (referred to as "C") and the mixture signal Ye+G (referred to as "D") are alternately obtained on the horizontal scanning line ODD2, as shown in FIG. 2(B). On the other hand, the mixture signals G+Cy and Mg+Ye are alternately obtained on the horizontal scanning line EVEN1. These signals are the same as the mixture signals A an B, respectively. Similarly, the mixture signals Mg+Cy and G+Ye are alternately obtained on the horizontal scanning line EVEN2. These signals are the same as the mixture signals C an D, respectively.

In FIG. 1, a sampling hold circuit 12 for extracting a video signal is provided, and a video signal processing circuit 14 is connected to the sampling hold circuit 12 through an A/D converter 13. The video signal processing circuit 14 executes processings such as gamma correction and temporarily stores the video signal in a memory. The output of the video signal processing circuit 14 is supplied to a monitor or the like through a D/A converter 15.

A mixture signal sampling circuit 16, a saturation level detection circuit 17 and a gain controller 18 are provided at a subsequent stage to the sampling hold circuit 12. The mixture signal sampling circuit 16 samples the mixture signal B (Ye+Mg) in this embodiment, and the saturation level detection circuit 17 detects the saturated state of the mixture signal B by comparing the voltage of the mixture signal B with a reference voltage Vref by a comparator 20. The gain controller 18 is provided with a multiplier 21 and a switching circuit 23 for multiplying the gain of a signal by a preset amplification coefficient. The switching circuit 23 connects the input line to the multiplier 21 when the saturated state is detected by the saturation level detection circuit 17, while connecting the input line to the sampling hold circuit 12 in the other cases. If signals are converted into digital signals, a ROM is provided and the preset amplification coefficient used for multiplication of the gain of the mixture signal is stored in the ROM.

It is possible to process the mixture signals D and C as well as the mixture signal B in the same way by the mixture signal sampling circuit 16, the saturation level detection circuit 17 and the gain controller 18. In this case, different amplification coefficients are allotted to the respective mixture signals.

Figure 3:
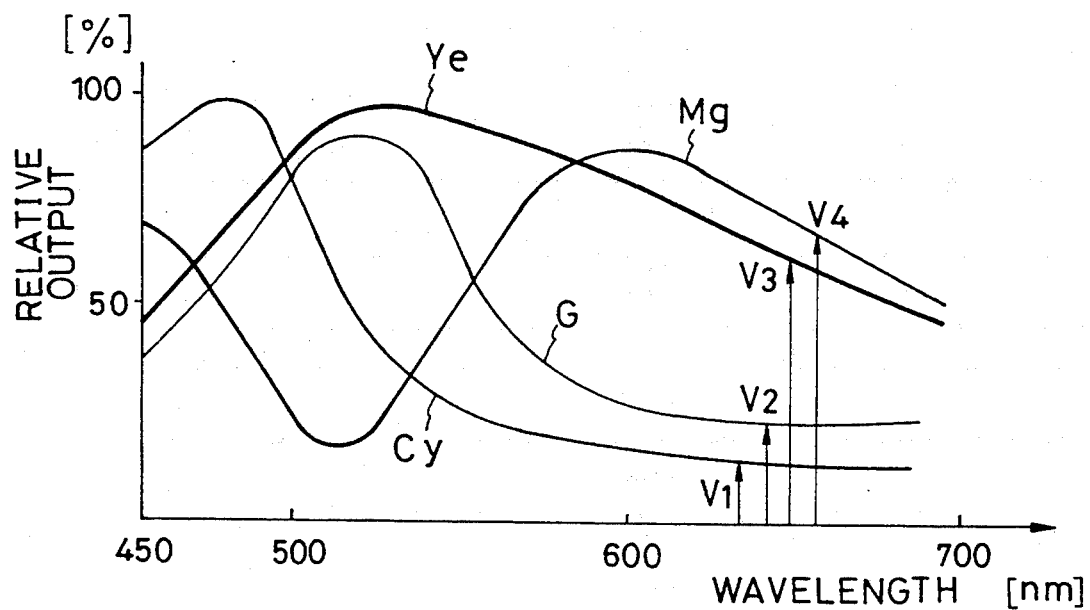
FIG. 3 shows the waveforms of the relative outputs (%) of the CCD to the wavelengths (nm) of the respective color filters in the first embodiment.
Figure 8:
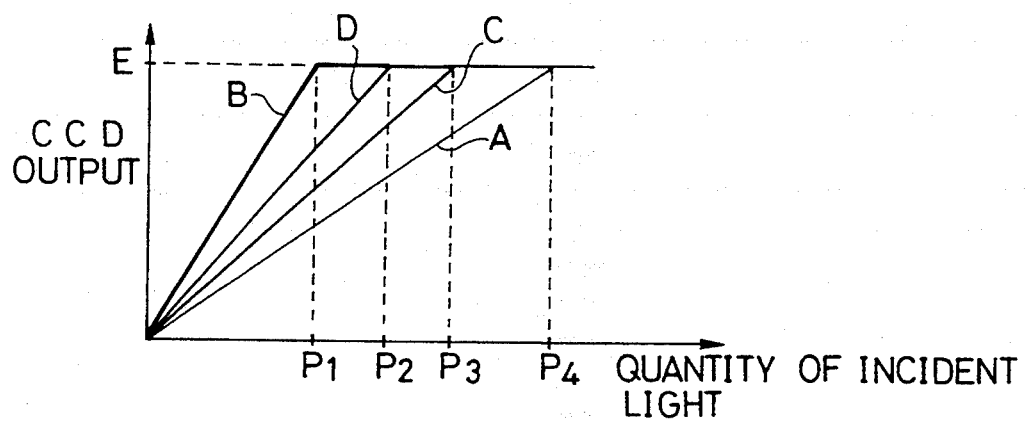
FIG. 8 shows the saturation properties of the mixture signals in the conventional signal processing circuit.
Figure 9:
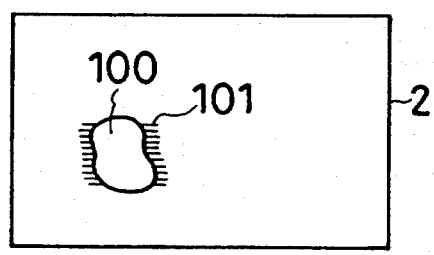
FIG. 9 shows the picture quality deterioration phenomenon due to the saturation of a mixture signal in the conventional signal processing circuit.

FIG. 3 shows the sensitivity of each color. The abscissa represents a wavelength, and the ordinate represents the relative output of the CCD 10. In the wavelength range on the red side, which is on the righthand side in FIG. 3, the outputs V1, V2, V3 and V4 of the colors Cy, G, Ye and Mg read out of the CCD 10 in an ascending order. Therefore, the outputs of the mixture signal read out of the CCD 10 are saturated in the order of B, D, C and A, as described above (FIG. 8). The amplification coefficient in the multiplier 21 is determined while taking the property of a mixture signal in the wavelength range (about 600 to 700 nm) on the red side into consideration.

The operation of the first embodiment having the above-described structure will now be explained. The mixture signals A, B, A, B, . . . are alternately obtained on the horizontal scanning line ODD1 from the CCD 10, as shown in FIG. 2(B). Video signals in one odd field are read out by this repetition. This is the same with the horizontal scanning lines EVEN 1, EVEN2 in even fields. These video signals are sampled and held by the sampling hold circuit 12 and output to the gain controller 18. The mixture signal sampling circuit 16 extracts the mixture signal B from the outputs of the sampling hold circuit 12. The voltage of the mixture signal B is then compared with the reference voltage Vref by the comparator 20 so as to judge whether or not the gain of the mixture signal B has reached the saturation level. If the gain has reached the saturation level, the signal High is supplied to the switching circuit 23 as a signal indicating the saturated state. The switching circuit 23 then switches the input line over to the multiplier 21.

In the gain controller 18, the outputs of the sampling hold circuit 12 are introduced to the multiplier 21, and the mixture signal B is multiplied (amplified) by a preset coefficient (more than 1). In this way, in the first embodiment, when the mixture signal B is saturated, it is amplified so as to substantially cancel the saturated state on the wavelenth range on the red side. The video signals output from the multiplier 21 are input to the video processing circuit through the A/D converter 13. After the video signals are subjected to a predetermined processing, they are supplied to the monitor or the like through the D/A converter 15.

Figure 4:
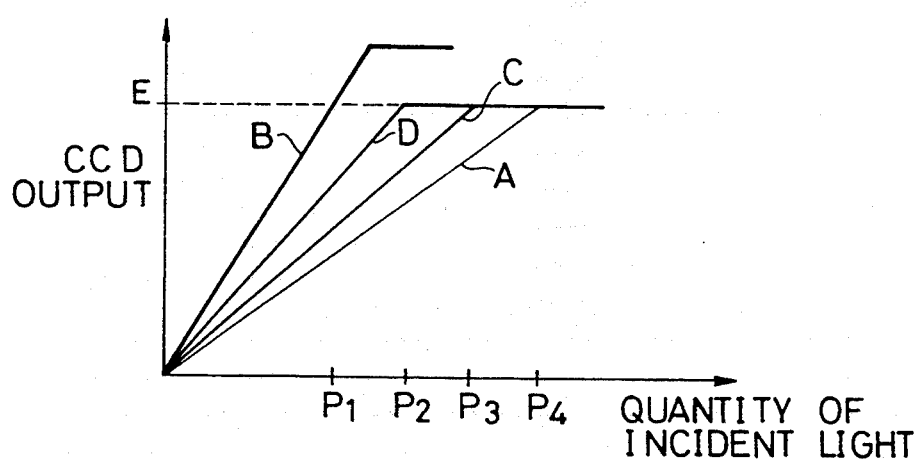
FIG. 4 shows the apparent saturation properties of the mixture signals in the first embodiment.

FIG. 4 shows the saturation properties in the first embodiment. The output of the mixture signal B from the CCD is raised to the value higher than the saturation point E, so that the saturated state is apparently cancelled and it is possible to suppress the looming of the scanning lines. In place of the mixture signal B, the saturated state of the mixture signal D may be detected. In this case, the mixture signal D is multiplied by a preset coefficient and, simultaneously, the mixture signal B is multiplied by a coefficient larger than the coefficient of the mixture signal D.

Figure 5:
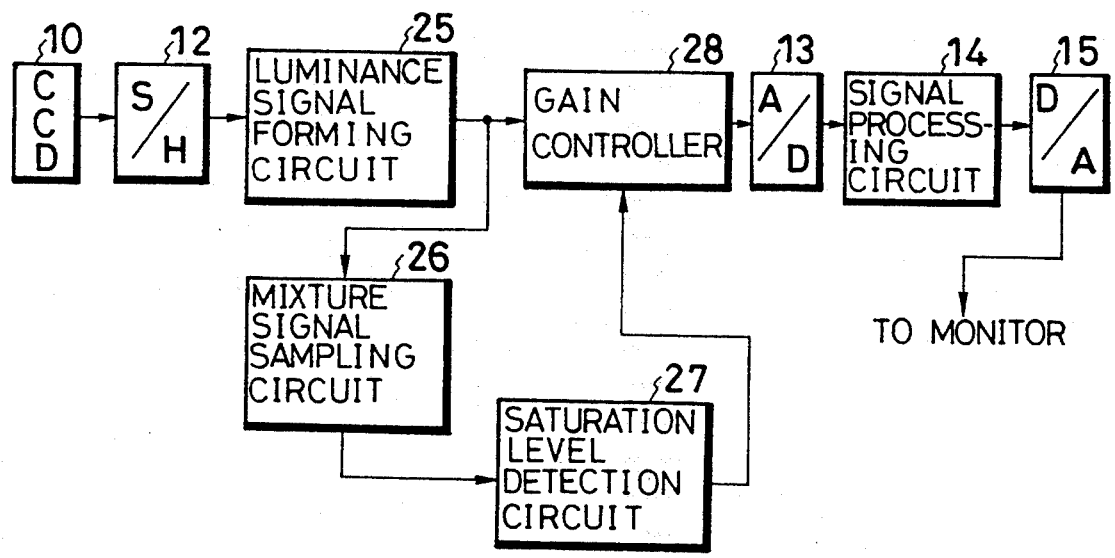
FIG. 5 is a block diagram of the structure of a second embodiment of a signal processing circuit of a simultaneous electronic endoscope apparatus.

FIG. 5 shows the structure of a second embodiment. In this embodiment, a luminance signal is used as a mixture signal. As shown in FIG. 5, a luminance signal forming circuit 25, a mixture signal sampling circuit 26, a saturation level detection circuit 27 and a gain controller 28 are provided at the subsequent stage to the sampling hold circuit 12. The luminance signal forming circuit 25 forms a luminance signal YE1=A+B=(Cy+G)+(Ye+Mg) on the horizontal scanning line ODD1 of an odd field, and a luminance signal YE2=C+D=(Cy+Mg)+(Ye+G) on the horizontal scanning line ODD2 of an odd field. A coefficient may be attached to each color signal. Similar signals are formed on the horizontal scanning lines EVEN 1, EVEN2 of even fields.

The mixture signal sampling circuit 26 extracts both luminance signals YE1 and YE2. The saturation level detection circuit 27 judges whether or not the level of the luminance signals YE1 containing the mixture signal B is larger than the reference level, and whether or not the level of the luminance signals YE1 is lower than the level of the luminance signal YE2. When the level of the luminance signal YE1 is higher than the reference level but smaller than the level of the luminance signal YE2, the luminance signal YE1 is judged to be saturated. When the luminance signal YE1 is saturated, the gain controller 28 adjusts the gain of the luminance signal YE1 to the level of the luminance signal YE2.

Figure 6:
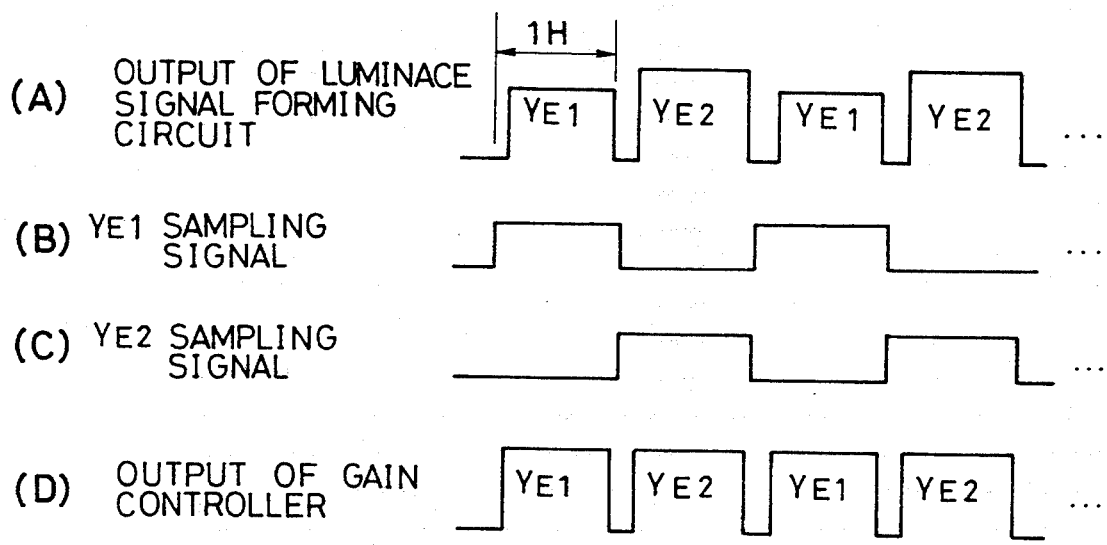
FIG. 6 is a waveform illustration of the operation of the second embodiment shown in FIG. 5.
Figure 7A:
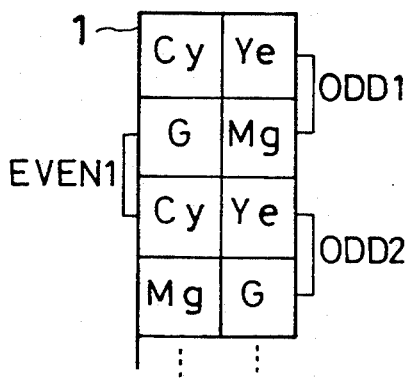
FIG. 7(A) shows an example of the arrangement of the color filters in a conventional signal processing circuit.
Figure 7B:
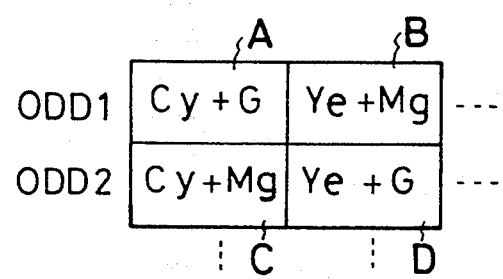
FIG. 7(B) shows the signals read out on each horizontal scanning line in the conventional signal processing circuit.

FIG. 6 shows the waveforms of the signals in the second embodiment. When the signal YE1 assumes the saturated state, the outputs of the signals YE1, YE2 supplied from the luminance signal forming circuit 25 are as shown in FIG. 6(A). When these signals are input to the sampling circuit 26, the luminance signals YE1 and YE2 for the respective horizontal scanning lines are separated from each other by a YE1 sampling signal and a YE2 sampling signal shown in FIGS. 6(B) and 6(C), respectively. When the saturated state of the luminance signal YE1 is detected, since the level of the luminance signal is raised to the level of the luminance signal YE2 by the gain controller 28, both levels agree with each other, as shown in FIG. 6(D). Thus, the saturated state of a mixture signal is also apparently cancelled in the second embodiment.

As described above, according to the present invention, a predetermined mixture signal such as Ye+Mg and Ye+G or a luminance signal is sampled so as to detect the saturated state. When the mixture signal Ye+Mg or Ye+G is saturated, it is multiplied by a preset coefficient. When a luminance signal is saturated, the gain of the luminance signal is adjusted so that the level of the luminance signal agrees with that of the luminance signal on a different horizontal scanning line. It is therefore possible to suppress the looming of the scanning lines, thereby preventing the deterioration of the picture quality.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An electronic endoscope apparatus comprising:
   a simultaneous electronic endoscope apparatus having a color filter for each pixel
   an image pickup device circuit for forming a plurality of mixture signals by combining different pixel signals;
   a sampling circuit for sampling a predetermined mixture signal out of said plurality of mixture signals;
   a saturation state detection circuit for judging whether or not the predetermined signal is saturated;
   a gain control circuit for controlling the gain of the predetermined mixture signal so as to be amplified when the sampled signal is saturated, and
   wherein each of said mixture signals is formed by mixing upper and lower pixel signals in a charge coupled device, and said gain control circuit amplifies said predetermined mixture signal by a preset coefficient greater than 1 when the sampled signal is saturated.

2. An electronic endoscope apparatus comprising:
   a simultaneous electronic endoscope apparatus having a color filter for each pixel
   an image pickup device circuit for forming a plurality of mixture signals by combining pixel signals obtained through color filters;
   a luminance signal forming circuit for forming two types of luminance signals by combining said plurality of mixture signals formed on each horizontal scanning line;
   a saturation state detection circuit for judging whether or not one of said luminance signals is saturated;
   and a gain control circuit for controlling the gain of said luminance signal so as to adjust the level of said one of said luminance signals to the level of the other of said luminance signals on another horizontal scanning line when in a saturated state.

* * * * *